(12) United States Patent
Zhu et al.

(10) Patent No.: US 12,427,631 B2
(45) Date of Patent: Sep. 30, 2025

(54) POWER TOOL AND CONTROL METHOD THEREFOR

(71) Applicant: Nanjing Chervon Industry Co., Ltd., Nanjing (CN)

(72) Inventors: Hong Zhu, Nanjing (CN); Zhijian Lu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 182 days.

(21) Appl. No.: 18/313,062

(22) Filed: May 5, 2023

(65) Prior Publication Data
US 2023/0271305 A1    Aug. 31, 2023

Related U.S. Application Data

(63) Continuation of application No. PCT/CN2021/131633, filed on Nov. 19, 2021.

(30) Foreign Application Priority Data

Dec. 30, 2020    (CN) .......................... 202011630501.X
Dec. 30, 2020    (CN) .......................... 202011630511.3
Dec. 30, 2020    (CN) .......................... 202011630527.4

(51) Int. Cl.
*H02M 1/36*    (2007.01)
*B23Q 5/027*    (2006.01)
(Continued)

(52) U.S. Cl.
CPC ............ *B25B 21/008* (2013.01); *B23Q 5/027* (2013.01); *B23Q 5/04* (2013.01); *B25F 5/001* (2013.01)

(58) Field of Classification Search
CPC ........ B25B 21/008; B23Q 5/027; B23Q 5/04; B25F 5/001; H02M 1/36; F02B 63/042
See application file for complete search history.

(56) References Cited

U.S. PATENT DOCUMENTS

2006/0197396 A1    9/2006  Pollock
2007/0182349 A1    8/2007  Fujita
(Continued)

FOREIGN PATENT DOCUMENTS

CA    2762473 A1    6/2012
CN    1965470 A     5/2007
(Continued)

OTHER PUBLICATIONS

ISA/CN, Int. Search Report issued on PCT application No. PCT/CN2021/131633, dated Jan. 26, 2022, 4 pages.
(Continued)

*Primary Examiner* — Cortez M Cook
(74) *Attorney, Agent, or Firm* — Greenberg Traurig, LLP

(57) ABSTRACT

A power tool includes a motor including a rotor and multi-phase stator windings; a driver circuit having multiple switch elements for outputting switch signals to drive the motor to rotate; and a controller electrically connected to at least the driver circuit and the motor. The controller is configured to acquire rotor position information of the motor and adjust a resultant magnetic potential of the motor according to the rotor position information such that an output electrical parameter of the motor corresponding to the resultant magnetic potential is within a preset parameter range.

9 Claims, 8 Drawing Sheets

(51) Int. Cl.
  *B23Q 5/04* (2006.01)
  *B25B 21/00* (2006.01)
  *B25F 5/00* (2006.01)

(56) References Cited

U.S. PATENT DOCUMENTS

| | | |
|---|---|---|
| 2011/0279070 A1 | 11/2011 | Tanaka |
| 2012/0091940 A1 | 4/2012 | Nashiki et al. |
| 2019/0229660 A1* | 7/2019 | Liao ................ F02B 63/042 |
| 2020/0282508 A1* | 9/2020 | Wang ................ H02M 1/36 |
| 2020/0389110 A1 | 12/2020 | Yajurvedi |

FOREIGN PATENT DOCUMENTS

| | | |
|---|---|---|
| CN | 102291070 A | 12/2011 |
| CN | 102611370 A | 7/2012 |
| CN | 102025305 B | 9/2012 |
| CN | 103296948 A | 9/2013 |
| CN | 103347658 B | 1/2016 |
| CN | 106911279 A | 6/2017 |
| CN | 104333277 A | 8/2017 |
| EP | 3731404 A1 | 10/2020 |
| JP | 2000197204 A | 7/2000 |
| JP | 2005027390 A | 1/2005 |
| JP | 2006081271 A | 3/2006 |
| JP | 2007089322 A | 4/2007 |
| WO | 2009036597 A1 | 3/2009 |
| WO | 2020192214 A1 | 10/2020 |
| WO | 2020214649 A1 | 10/2020 |

OTHER PUBLICATIONS

ISA/CN, English translation of Int. Search Report issued on PCT application No. PCT/CN2021/131633, dated Jan. 26, 2022, 2 pages.
ISA/CN, Written Opinion issued on PCT application No. PCT/CN2021/131633, dated Jan. 26, 2022, 4 pages.
ISA/CN, English translation of Written Opinion issued on PCT application No. PCT/CN2021/131633, dated Jan. 26, 2022, 3 pages.
Anonymous: "BaiDu BaiKe—MMF", Mar. 8, 2024 (Mar. 8, 2024), XP093139209, Retrieved from the Internet: URL: https://baike.baidu.com/item/??/7642557, [retrieved on Mar. 8, 2024].
Extended Search Report from European application No. 21913583.7, dated Mar. 18, 2024, 8 pp.

* cited by examiner

POWER TOOL AND CONTROL METHOD THEREFOR

RELATED APPLICATION INFORMATION

This application is a continuation of International Application Number PCT/CN2021/131633, filed on Nov. 19, 2021, through which this application also claims the benefit under 35 U.S.C. § 119(a) of Chinese Patent Application No. 202011630527.4, filed on Dec. 30, 2020, Chinese Patent Application No. 202011630511.3, filed on Dec. 30, 2020, and Chinese Patent Application No. 202011630501.X, filed on Dec. 30, 2020, which applications are incorporated herein by reference in their entirety.

BACKGROUND

Permanent magnet motors, including inrunners and outrunners, have speed control requirements under different loads or torque. Common speed control manners generally include speed control by voltage regulation, speed control by field weakening, and speed control based on a sensor position. However, the speed control by voltage regulation has a relatively high overall cost, the speed control by field weakening is very easy to implement in electrically excited motors and cannot be applied to the permanent magnet motors, and the permanent magnet motors can achieve speed control only by using an armature effect.

The field weakening technique can adjust a rotational speed by changing a lead angle. However, when the lead angle is changed to increase the rotational speed, a load increases and an output rotational speed decreases rapidly. That is to say, the rotational speed is unstable, and output torque decreases due to the increase of the load, affecting the ability of a motor to do work.

SUMMARY

A power tool includes: a motor including a rotor and multi-phase stator windings; a driver circuit having multiple switch elements for outputting switch signals to drive the motor to rotate; and a controller electrically connected to at least the driver circuit and the motor. The controller is configured to acquire rotor position information of the motor; and adjust a resultant magnetic potential of the motor according to the rotor position information such that an output electrical parameter of the motor corresponding to the resultant magnetic potential is within a preset parameter range.

In one example, the controller is configured to control conduction states of the driver circuit based on the rotor position information to adjust a stator magnetic potential of the stator windings; and calculate the resultant magnetic potential of the motor based on a rotor magnetic potential of the motor and the adjusted stator magnetic potential of the motor such that the output electrical parameter of the motor corresponding to the resultant magnetic potential is within the preset parameter range.

In one example, the power tool also includes a rotor position detection module configured to detect a rotor position of the motor and an electrical parameter detection module electrically connected to the motor and configured to detect the output electrical parameter of the motor.

In one example, the rotor position detection module includes a Hall sensor.

In one example, the rotor position detection module is configured to estimate the rotor position based on a back electromotive force of the stator windings or estimate the rotor position based on phase currents of the stator windings.

In one example, the controller is configured to, when the rotor is at a first preset position, control the driver circuit to change conduction states to increase a stator magnetic potential; and when the rotor is at a second preset position, control the driver circuit to change the conduction states to decrease the stator magnetic potential.

In one example, the electrical parameter includes a rotational speed of the motor.

In one example, the controller is configured to calculate, based on a rotor magnetic potential of the motor and an adjusted stator magnetic potential of the motor, a first resultant magnetic potential in a first direction and a second resultant magnetic potential in a second direction such that a rotational speed of the motor corresponding to the first resultant magnetic potential is within a preset rotational speed range and work efficiency of the motor corresponding to the second resultant magnetic potential is within a preset efficiency range.

In one example, the first direction is perpendicular to the second direction.

In one example, the motor has three-phase stator windings; and the controller is configured to, when the rotor is at a first preset position, control the driver circuit to change conduction states such that the three-phase stator windings of the motor are all on to access a power module; and when the rotor is at a second preset position, control the driver circuit to change the conduction states such that any two phases of the three-phase stator windings of the motor are on to access the power module.

A control method for a power tool is provided. The power tool includes: a motor including a rotor and multi-phase stator windings; a driver circuit having multiple switch elements for outputting switch signals to drive the motor to rotate; and a controller electrically connected to at least the driver circuit and the motor. The control method includes: acquiring rotor position information of the motor; and adjusting a resultant magnetic potential of the motor according to the rotor position information such that an output electrical parameter of the motor corresponding to the resultant magnetic potential is within a preset parameter range.

A power tool includes: a motor having multi-phase windings, where phase windings of the motor are capable of being on at a first electrical angle in a first conduction manner and being on at a second electrical angle in a second conduction manner within a selected phase band; a torque detection module configured to detect first electromagnetic torque of the motor when the motor is on at the first electrical angle in the first conduction manner and second electromagnetic torque of the motor when the motor is on at the second electrical angle in the second conduction manner; and a controller electrically connected to at least the torque detection module and the motor. The controller is configured to acquire the first electromagnetic torque and the second electromagnetic torque and calculate, based on the first electromagnetic torque, the second electromagnetic torque, and reluctance torque of the motor, total torque of the motor at a unit current within the phase band; and adjust the first electrical angle and the second electrical angle such that the total torque of the motor at a unit current within the selected phase band is within a preset torque range.

In one example, the reluctance torque of the motor is a sine-like wave.

In one example, the first conduction manner includes that any two phase windings of the phase windings of the motor are on; and the second conduction manner includes that three phase windings of the phase windings of the motor are on.

In one example, the controller is configured to detect a rotor position of the motor; switch to the second conduction manner when the rotor position reaches a first preset position in the first conduction manner; and switch to the first conduction manner when the rotor position reaches a second preset position in the second conduction manner.

In one example, the ratio of the first electrical angle to the second electrical angle within the selected phase band is obtained according to the preset torque range in a table look-up manner.

A control method for a power tool is provided. The power tool includes: a motor having multi-phase windings, where phase windings of the motor are capable of being on at a first electrical angle in a first conduction manner and being on at a second electrical angle in a second conduction manner within a selected phase band; a torque detection module configured to detect first electromagnetic torque of the motor when the motor is on at the first electrical angle in the first conduction manner and second electromagnetic torque of the motor when the motor is on at the second electrical angle in the second conduction manner; and a controller electrically connected to at least the torque detection module and the motor. The control method includes: acquiring the first electromagnetic torque and the second electromagnetic torque and calculating, based on the first electromagnetic torque, the second electromagnetic torque, and reluctance torque of the motor, total torque of the motor at a unit current within the phase band; and adjusting the first electrical angle and the second electrical angle such that the total torque of the motor at a unit current within the phase band is within a preset torque range.

In one example, the reluctance torque of the motor is a sine-like wave.

In one example, the first conduction manner includes that any two phase windings of the phase windings of the motor are on; and the second conduction manner includes that three phase windings of the phase windings of the motor are on.

In one example, the method also includes: detecting a rotor position of the motor; switching to the second conduction manner when the rotor position reaches a first preset position in the first conduction manner; and switching to the first conduction manner when the rotor position reaches a second preset position in the second conduction manner.

In one example, the ratio of the first electrical angle to the second electrical angle within the selected phase band is obtained according to the preset torque range in a table look-up manner.

A power tool includes: a motor having multi-phase stator windings, where phase windings of the motor are capable of being on in a first conduction manner and a second conduction manner within a selected phase band; a torque detection module configured to detect output torque of the motor; a rotational speed detection module configured to detect a rotational speed of the motor; and a controller electrically connected to at least the torque detection module, the rotational speed detection module, and the motor. The controller is configured to acquire the output torque of the motor and the rotational speed of the motor; in a first working stage, adjust an electrical angle at which the motor is on in the second conduction manner such that the rotational speed of the motor is kept in a substantially stable state; and in a second working stage, control the stator windings to be on at a first preset electrical angle in the second conduction manner.

In one example, the controller is configured to, in the first working stage and the second working stage, control the stator windings to be on at a second preset electrical angle in the first conduction manner.

In one example, the controller is configured to, in the first working stage, when the electrical angle at which the motor is on in the second conduction manner reaches a preset angle threshold, control the stator windings to be on at a third preset electrical angle in the second conduction manner.

In one example, the power tool also includes a current detection module configured to detect a working current of the motor; and the controller is configured to acquire the working current of the motor and calculate a change slope of the working current; and in the first working stage, when the working current of the motor reaches a current threshold at a first change slope, control the stator windings to be on at the first preset electrical angle so that the motor enters the second working stage.

In one example, an output current of the motor in the first working stage has the first change slope, and an output current of the motor in the second working stage has a second change slope; where the first change slope is greater than the second change slope.

In one example, in the first working stage, when a working current of the motor reaches a current threshold at a first change slope, the electrical angle at which the stator windings are on in the second conduction manner is a maximum electrical angle reachable in the second conduction manner.

In one example, the first preset electrical angle is smaller than or equal to the maximum electrical angle at which the stator windings are on in the second conduction manner in the first working stage.

In one example, the first conduction manner includes that any two phase windings of the phase windings of the motor are on; and the second conduction manner includes that three phase windings of the phase windings of the motor are on.

A control method for a power tool is provided. The power tool includes: a motor having multi-phase stator windings, where phase windings of the motor are capable of being on in a first conduction manner and a second conduction manner within a selected phase band; a torque detection module configured to detect output torque of the motor; a rotational speed detection module configured to detect a rotational speed of the motor; and a controller electrically connected to at least the torque detection module, the rotational speed detection module, and the motor. The control method includes: acquiring the output torque of the motor and the rotational speed of the motor; in a first working stage, adjusting an electrical angle at which the motor is on in the second conduction manner such that the rotational speed of the motor is kept in a substantially stable state; and in a second working stage, controlling the stator windings to be on at a first preset electrical angle in the second conduction manner.

In one example, the method also includes: in the first working stage and the second working stage, controlling the stator windings to be on at a second preset electrical angle in the first conduction manner.

The present application has the following benefits: the stator magnetic potential of the motor is adjusted so that the power tool can effectively consider the ability of the motor to do work and an increase of the rotational speed of the motor.

DETAILED DESCRIPTION

Figure 1:
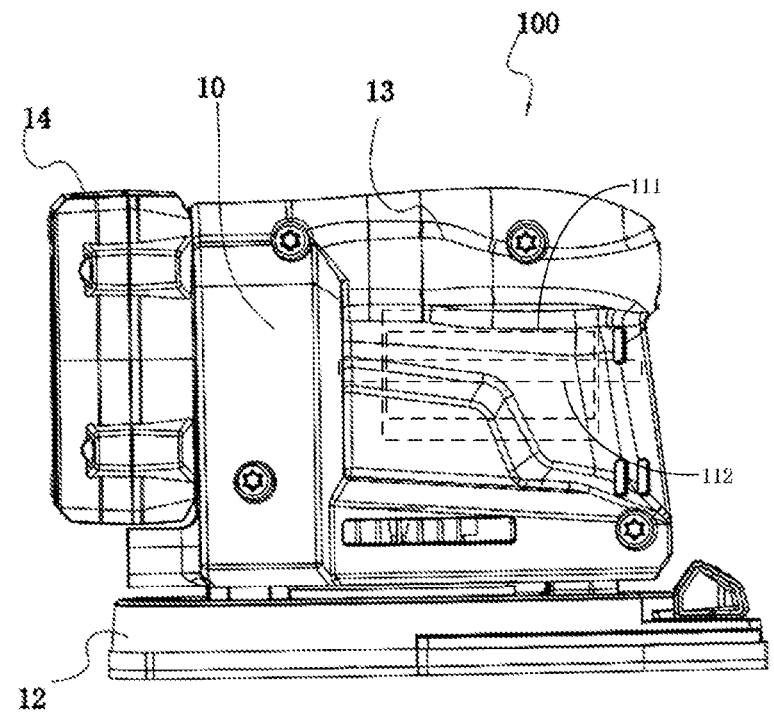
FIG. 1 is a structural view of a power tool according to an example of the present application.

The present application is described below in detail in conjunction with drawings and examples. It is to be understood that the examples described herein are intended to illustrate the present application and not to limit the present application. Additionally, it is to be noted that for ease of description, only part, not all, of structures related to the present application are illustrated in the drawings.

Unless otherwise defined, all technical and scientific terms used herein have the same meanings as those commonly understood by those skilled in the art to which the present application pertains. The terms used in the specification of the present application are used for describing examples and are not intended to limit the present application. The term "and/or" used herein includes any or all combinations of one or more listed associated items.

A power tool to which the technical solutions of the present application are applicable includes any power tool that can adopt brushless sensorless electronic control, such as a grinding tool, an electric drill, an electric circular saw, a reciprocating saw, and a miter saw. Other types of power tools that can adopt the essential content of the technical solutions disclosed below fall within the scope of the present application.

In examples of the present application, referring to FIG. 1, with a sander as an example, a power tool 100 includes at least a housing 10, a motor 11 in the housing, a base plate 12, a transmission mechanism (not shown), a grip 13, and a battery pack 14, and the motor 11 includes a rotor 111 and a stator 112.

The motor is built in the housing 10. In an example, the housing 10 includes a left housing and a right housing, where the left housing and the right housing are closed to the middle from the left and the right respectively and fastened by screws during assembly. In an example, a motor shaft of the motor is parallel to the base plate 12 and built in the front end of the tool 100. The motor drives the transmission mechanism so that grinding sandpaper fixed on the base plate 12 performs grinding. The transmission mechanism is at least used for connecting the motor shaft and an output shaft and may be a two-stage transmission gear. The housing 10 is formed with the grip 13 in line with ergonomics and for a user to hold. The tool 100 also includes an electronic membrane switch for controlling startup and shutdown. The battery pack 14 is inserted into the rear end of the tool, a longest side of the battery pack 14 is parallel to the plane of the base plate, and the tool has a relatively small overall volume.

Figure 2:
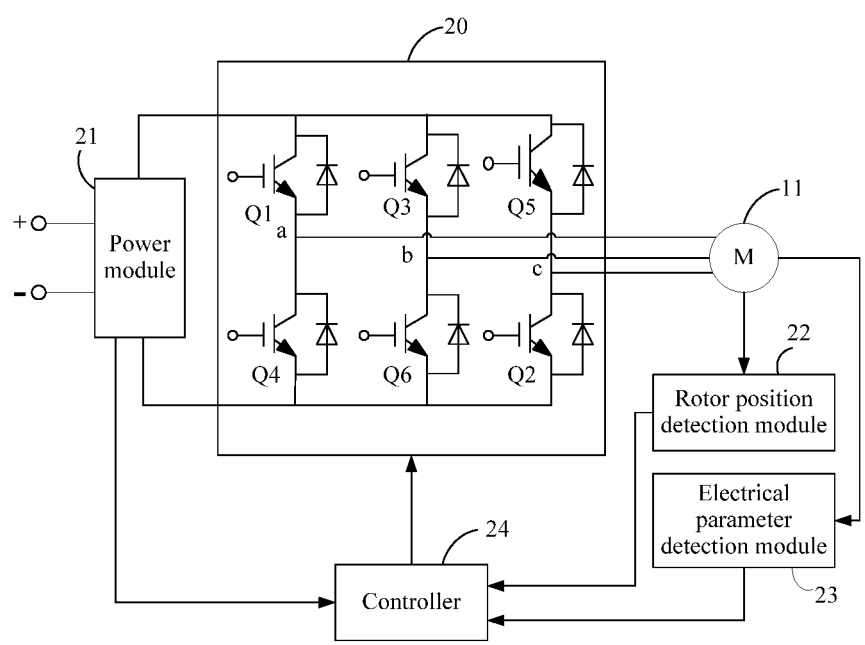
FIG. 2 is a circuit block diagram of a power tool according to an example of the present application.

Referring to the circuit block diagram of the power tool shown in FIG. 2, a drive system for the motor 11 may include at least a driver circuit 20, a power module 21, a rotor position detection module 22, an electrical parameter detection module 23, and a controller 24.

In an example, the motor 11 is a brushless direct current (BLDC) motor. In an example, the motor 11 is a sensorless BLDC motor. In an example, the motor 11 is a sensored BLDC motor. In the present application, the BLDC motor may be an inrunner or an outrunner, and the motor 11 includes at least three-phase stator windings A, B, and C, where three phase windings may use a star connection or a delta connection. During speed control of the motor, for the BLDC motor with a Hall sensor or another hardware device for detecting a rotor position, the rotor position can be directly detected by the sensor, and a rotational speed of the motor is adjusted according to the rotor position. Since the sensorless BLDC motor has no sensor for detecting the rotor position, the rotor position can be detected through the detection of a back electromotive force of the windings or in other manners. However, when the sensorless BLDC motor is started or has a load at a low speed, the rotor position cannot be accurately acquired, resulting in unstable output torque. The speed control of the sensorless BLDC motor is generally implemented by field weakening or voltage regulation, where speed control by voltage regulation has a relatively high cost, and traditional speed control by field weakening greatly reduces an ability of the motor to do work. In the present application, the speed control by adjusting a stator magnetic potential can solve the above problems. The rotational speed of the motor can also be adjusted in the manner of adjusting the stator magnetic potential in the sensored BLDC motor.

In an example, an alternating current power supply may be selected so that the power module 21 can access AC mains of 120 V or 220 V. In an example, a battery pack may be selected as a power supply, where the battery pack may be composed of a set of battery cells. For example, the battery cells may be connected in series to form a single power supply branch, so as to form a 1P battery pack. An output voltage of the battery pack is changed by a specific power supply control module, for example, a DC-DC module so that a power supply voltage suitable for the driver circuit 20, the motor 11, and the like is outputted to supply power to the driver circuit 20, the motor 11, and the like. It is to be understood by those skilled in the art that the DC-DC module is a mature circuit structure and may be selected according to specific parameter requirements of the power tool.

The rotor position detection module 22 is configured to identify the rotor position. In an example, the rotor position detection module 22 may include a Hall sensor for detecting the rotor position. In an example, the rotor position detection module 22 may estimate the rotor position based on a motor parameter such as a floating phase voltage or a phase current. In the present application, the rotor position detection module may include any other method or hardware device capable of detecting the rotor position.

The electrical parameter detection module 23 may detect, in real time, an electrical parameter in a working process of the motor 11, such as the rotational speed of the motor. Optionally, the electrical parameter detection module 23 may detect output torque of the motor or detect work efficiency of the motor based on the rotational speed and the torque.

The driver circuit 20 is electrically connected to the stator windings A, B, and C of the motor 11 and configured to transfer a current from the power module 21 to the stator windings A, B, and C to drive the motor 11 to rotate. As an example, the driver circuit 20 includes multiple switch elements Q1, Q2, Q3, Q4, Q5, and Q6. A gate terminal of each switch element is electrically connected to the controller 24 and configured to receive a control signal from the controller 24. A drain or a source of each switch element is connected to a stator winding A, B, or C of the motor 11. The switch elements Q1 to Q6 receive control signals from the controller 24 to change their respective conduction states, so as to change currents loaded by the power module 21 to the stator windings A, B, and C of the motor 11. In an example, the driver circuit 20 may be a three-phase bridge driver circuit including six controllable semiconductor power devices (such as field-effect transistors (FETs), bipolar junction transistors (BJTs), or insulated-gate bipolar transistors (IGBTs)). It is to be understood that the above switch element may be any other type of solid-state switch, such as an IGBT or a BJT.

To rotate the motor 11, the driver circuit 20 has multiple driving states, and the controller 24 may output corresponding pulse-width modulation (PWM) drive signals based on rotor position information to control the switch elements in the driver circuit 20 so that the driver circuit switches the conduction states, thereby changing conducting phases of the stator windings of the motor and the magnitude and the direction of a current through a conducting winding. It is to be noted that when the conducting phases of the stator windings are different and the magnitude and the direction of an energizing current through a winding change, the magnitude and the direction of the stator magnetic potential change.

Figure 3:
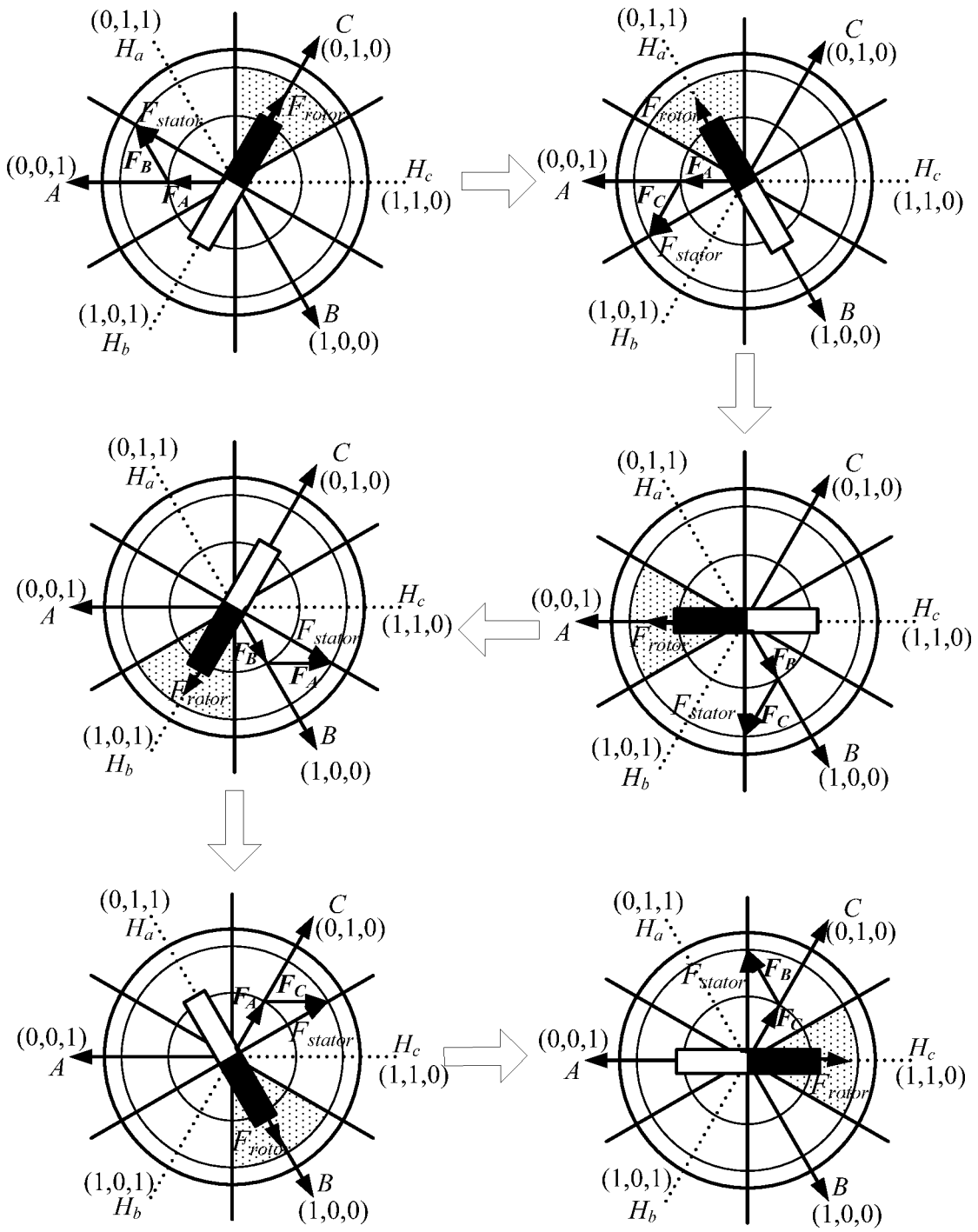
FIG. 3 is a schematic diagram of changes of magnetic potentials of a motor when two transistors are on according to an example of the present application.

FIG. 3 shows changes of magnetic potentials in a commutation process when two phases of three phase windings of a three-phase sensorless BLDC motor are on, that is, two transistors are on, where the magnetic potentials include a rotor magnetic potential $\vec{F}_{rotor}$ of the motor and a stator magnetic potential $\vec{F}_{stator}$ of the stator windings. Each time the rotor rotates by an electrical angle of 60°, the motor performs one commutation, that is, each phase winding occupies a phase band of 60°. The rotor corresponds to different position information within six different phase bands, and the PWM drive signals outputted by the controller 24 may correspond to six different signal combinations. In an example, a signal 0 represents an off state of the winding, and a signal 1 represents an on state of the winding. Additionally, dashed lines in FIG. 3 represent Hall scales formed when Hall positions of the three phase windings are parallel to the direction of the rotor, separately. Under the Hall scales, the Hall positions of the stator windings can be determined as the rotor position changes. Specifically, the Hall positions of the three phase windings, combinations of PWM signals outputted by the controller, and the corresponding conduction states of the stator windings are shown in Table 1.

TABLE 1

| Hall Position | PWM Signal Combination | Conduction States of Stator Windings |
|---|---|---|
| (0, 1, 0) | (1, 0, X) | A + B− |
| (0, 1, 1) | (1, X, 0) | A + C− |
| (0, 0, 1) | (X, 1, 0) | B + C− |
| (1, 0, 1) | (0, 1, X) | B + A− |
| (1, 0, 0) | (0, X, 1) | C + A− |
| (1, 1, 0) | (X, 0, 1) | C + B− |

In Table 1, 0 in the column of the Hall position represents that the Hall position of the corresponding winding falls at an S pole of the rotor, and 1 in the column of the Hall position represents that the Hall position of the corresponding winding falls at an N pole of the rotor. In Table 1, 0 in the column of the PWM signal combination represents that a lower transistor for the corresponding winding is on, 1 in the column of the PWM signal combination represents that an upper transistor for the corresponding winding is on, and X in the column of the PWM signal combination represents that neither the upper transistor nor the lower transistor for the corresponding winding is on.

As can be seen from FIG. 3, in an electrical angle interval of 360°, during the rotation of the rotor, the rotor magnetic potential $\vec{F}_{rotor}$ continuously changes in direction and remains unchanged in magnitude; and the stator magnetic potential $\vec{F}_{stator}$ is synthesized by magnetic potentials of two conducting phases of the stator windings, the direction of the stator magnetic potential changes with the commutation of the stator windings, and the magnitude of the stator magnetic potential is related to conduction directions and conduction currents of phase windings that are on. For example, in FIG. 3, when the PWM signals outputted by the controller are (1, 0, X), the rotor rotates within a phase band from 30° to 90°, the windings A and B are on in the manner of A+B−, the rotor magnetic potential $\vec{F}_{rotor}$ is parallel to the direction of the rotor, and the stator magnetic potential $\vec{F}_{stator}$ is synthesized by magnetic potentials of the phase windings A and B, that is, $\vec{F}_{stator}=\vec{F}_{AB}=\vec{F}_{A}-\vec{F}_{B}$. Each time the rotor rotates by an electrical angle of 60°, one commutation occurs. The commutation process of the rotor in accordance with the drive signals shown in Table 1 corresponds to the commutation process indicated by arrows in FIG. 3; accordingly, the rotor magnetic potential and the stator magnetic potential change as shown in FIG. 3.

Figure 4:
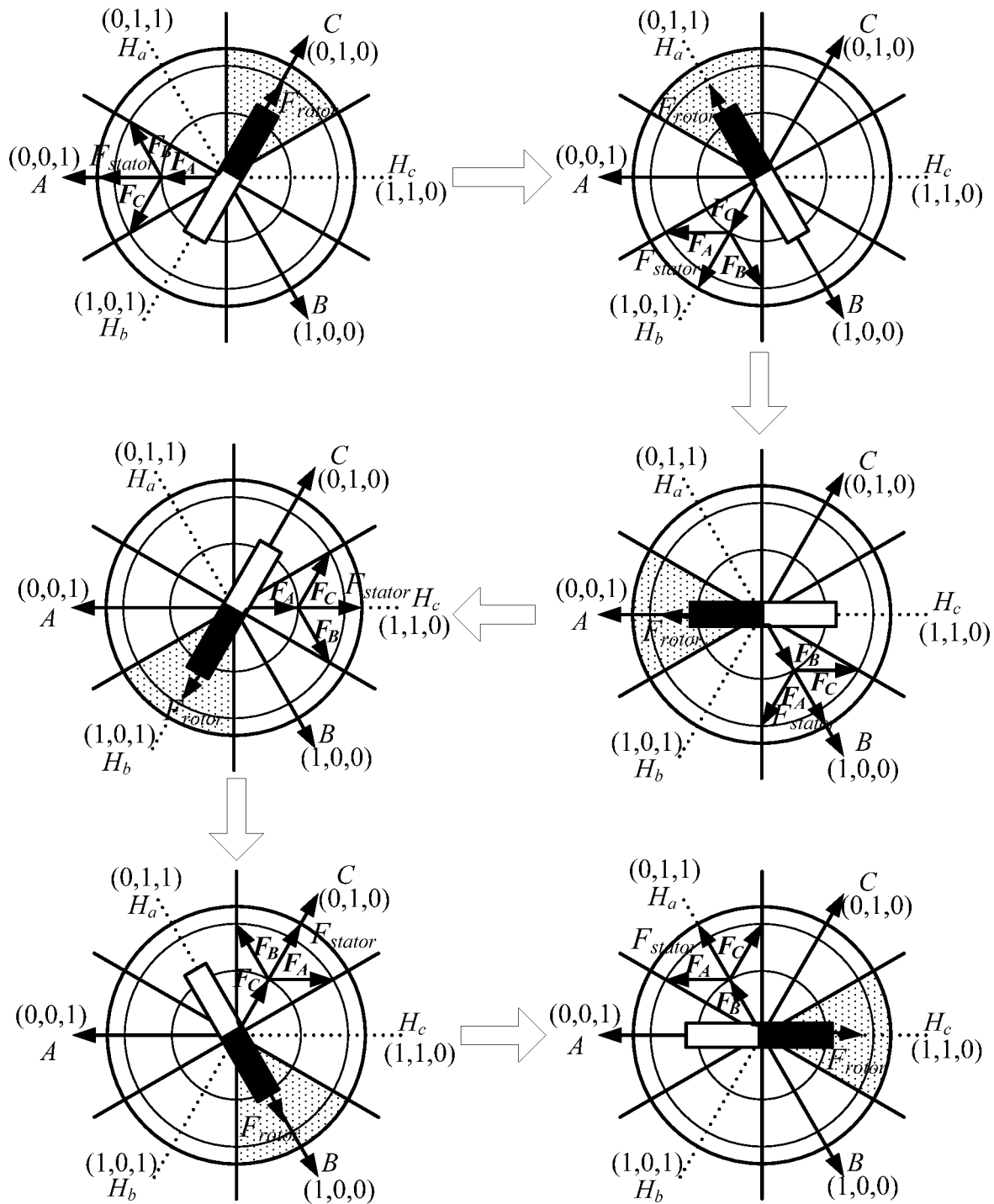
FIG. 4 is a schematic diagram of changes of magnetic potentials of a motor when three transistors are on according to an example of the present application.

FIG. 4 shows changes of the magnetic potentials when the three phase windings of the three-phase sensorless BLDC motor are on, that is, three transistors are on. Table 2 shows a correspondence relationship between the Hall positions, the PWM signals, and the conduction states of the stator windings of the motor when the three phase windings are on.

TABLE 2

| Hall Position | PWM Signal Combination | Conduction States of Stator Windings |
|---|---|---|
| (0, 1, 0) | (1, 0, 0) | A + B − C − |
| (0, 1, 1) | (1, 1, 0) | A + B + C − |
| (0, 0, 1) | (0, 1, 0) | B + C − A − |
| (1, 0, 1) | (0, 1, 1) | B + C + A − |
| (1, 0, 0) | (0, 0, 1) | C + A − B − |
| (1, 1, 0) | (1, 0, 1) | C + A + B − |

As can be seen from FIG. 4, in an electrical angle interval of 360°, during the rotation of the rotor, the rotor magnetic potential $\vec{F}_{rotor}$ continuously changes in direction and remains unchanged in magnitude; and the stator magnetic potential $\vec{F}_{stator}$ is synthesized by magnetic potentials of three conducting phases of the stator windings, the direction of the stator magnetic potential changes with the commutation of the stator windings, and the magnitude of the stator magnetic potential is related to conduction directions and conduction currents of the three phase windings. For example, in FIG. 4, when the PWM signals outputted by the controller are (1, 0, 0), the rotor rotates within the phase band from 30° to 90°, the windings A, B, and C are on in the manner of A+B−C−, the rotor magnetic potential $\vec{F}_{rotor}$ is parallel to the direction of the rotor, and the stator magnetic potential $\vec{F}_{stator}$ is synthesized by magnetic potentials of the phase windings A, B, and C, that is, $\vec{F}_{stator} = \vec{F}_{ABC} = \vec{F}_A - \vec{F}_B - \vec{F}_C$. Each time the rotor rotates by an electrical angle of 60°, one commutation occurs. The commutation process of the rotor in accordance with the drive signals shown in Table 2 corresponds to the commutation process indicated by arrows in FIG. 4; accordingly, the rotor magnetic potential and the stator magnetic potential change as shown in FIG. 4.

Figure 5:
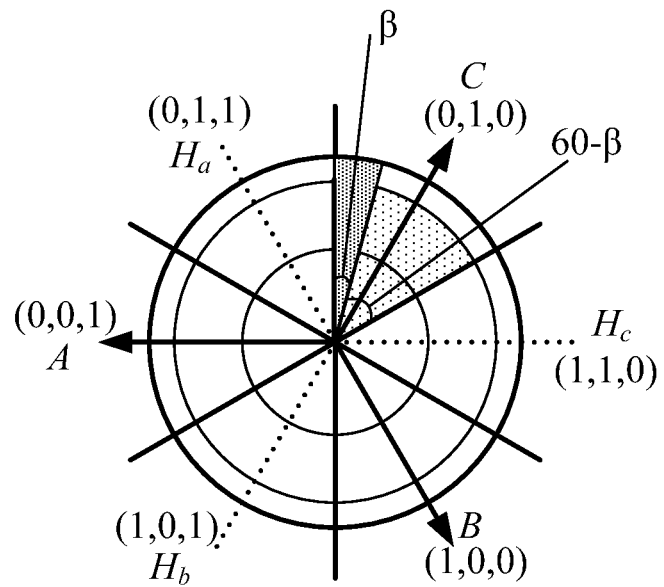
FIG. 5 is a schematic diagram of a conduction manner of windings within a certain phase band according to an example of the present application.

As can be seen from the comparison between FIG. 3 and FIG. 4, a conduction manner of the stator windings of the motor affects the magnitude of the stator magnetic potential, and the stator magnetic potential at a unit current when the three phase windings are on is greater than the stator magnetic potential at a unit current when two transistors for the windings are on. Therefore, to obtain a greater stator magnetic potential within a selected phase band, the controller 24 may change the PWM signals to control the stator windings to work in a combined conduction manner of two conducting transistors and three conducting transistors. Specifically, as shown in FIG. 5, within a phase band of 60°, the stator windings of the motor may be controlled to be on at an electrical angle of β° in a manner of three conducting transistors and be on at an electrical angle of (60−β°) in a manner of two conducting transistors, where β is defined as an expansion angle. In an example, the process of two conducting transistors within the selected phase band may be continuous or intermittent. The selected phase band may be a selected phase band of any size, and the size of the selected phase band is not limited in the examples of the present application.

Figure 6:
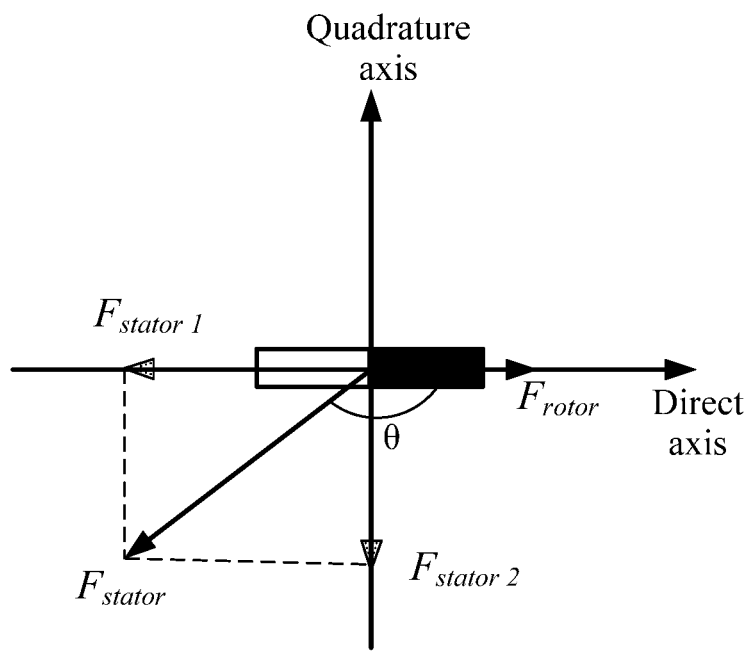
FIG. 6 is a schematic diagram of magnetic potential synthesis according to an example of the present application.

In an example, a resultant magnetic potential of the motor may be synthesized by the stator magnetic potential and the rotor magnetic potential in a certain manner. For example, as shown in FIG. 6, a first direction where the rotor is located is defined as a direct axis, and a second direction perpendicular to the direct axis is defined as a quadrature axis. Components $\vec{F}_{stator1}$ and $\vec{F}_{stator2}$ of the stator magnetic potential on the direct axis and the quadrature axis are synthesized with the rotor magnetic potential so that a first resultant magnetic potential in the direction of the direct axis and a second resultant magnetic potential in the direction of the quadrature axis can be formed. It is to be noted that the magnitude of the angle θ between the rotor magnetic potential and the stator magnetic potential shown in FIG. 6 can represent a current excitation ability of the motor. For example, when the angle θ between the rotor magnetic potential and the stator magnetic potential is an obtuse angle, the motor has a field weakening ability, and when θ is an acute angle, the motor has a field enhancing ability. In an example, the angle θ is an obtuse angle.

In the present application, the first resultant magnetic potential is $\vec{F}_{stator1}$ and $\vec{F}_{rotor}$ synthesized on the direct axis. As long as the resultant magnetic potential becomes smaller relative to the original magnitude of $\vec{F}_{rotor}$, it indicates that the field weakening ability of the motor is enhanced. Therefore, the magnitude of the first resultant magnetic potential represents the field weakening ability of the motor, and the first resultant magnetic potential is adjusted so that the rotational speed of the motor can be adjusted. The second resultant magnetic potential is the component $\vec{F}_{stator2}$ of the stator magnetic potential on the quadrature axis. Based on the angle θ between the stator magnetic potential and the quadrature axis shown in FIG. 6, since electromagnetic torque of the motor is $T=\partial W/\partial \varphi = K \sin \theta$ (where K is a fixed value and W denotes magnetic residual energy) and $\vec{F}_{stator2} = \vec{F}_{stator} \sin \theta$, the electromagnetic torque is $T=K \vec{F}_{stator2}/\vec{F}_{stator}$, that is, the electromagnetic torque is related to the component of the stator magnetic potential on the quadrature axis. Therefore, the magnitude of the second resultant magnetic potential represents the ability of the motor to do work. The magnitude of the second resultant magnetic potential is adjusted so that the electromagnetic torque can be adjusted, thereby affecting the ability of the motor to do work. It is to be noted that as can be seen from the resultant magnetic potential decomposition diagram shown in FIG. 6, the stator magnetic potential may be adjusted on the premise that the first resultant magnetic potential is kept unchanged so that the second resultant magnetic potential reaches a desired value. That is to say, in the present application, on the premise that the rotational speed of the motor is increased, the ability of the motor to do work can be ensured, that is, the work efficiency of the motor can be ensured.

In the present application, the work efficiency of the motor is power output efficiency of the motor and can represent the ability of the motor to do work.

Similarly, as can be seen from FIG. 6, the rotor position has a correspondence relationship with the rotor magnetic potential, and when the rotor position is determined, the stator magnetic potential is adjusted so that the resultant magnetic potential can be adjusted, thereby controlling an output electrical parameter of the motor.

Figure 7:
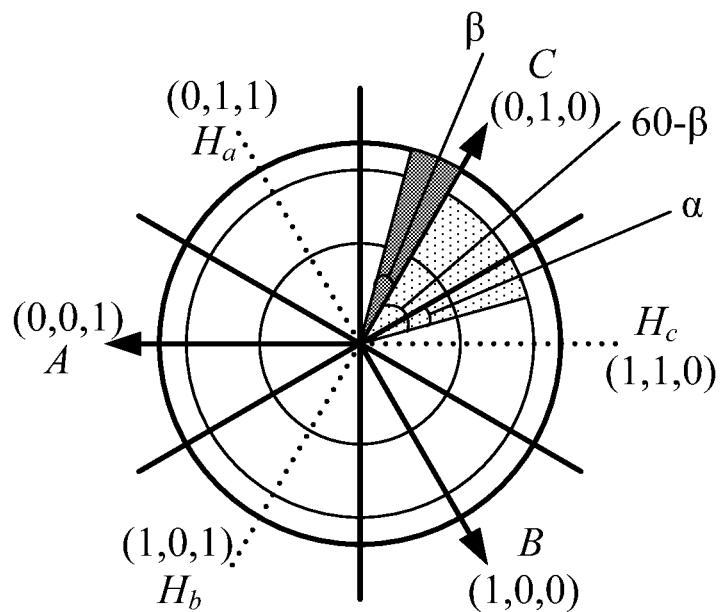
FIG. 7 is a schematic diagram of conduction manners of windings in combination with a lead angle within a certain phase band according to an example of the present application.

In an example, as shown in FIG. 7, to obtain a higher field weakening ability, a lead electrical angle α may be set. That is to say, the windings have a lead angle α whether the manner of two conducting transistors or the manner of three conducting transistors is used.

Figure 8A:
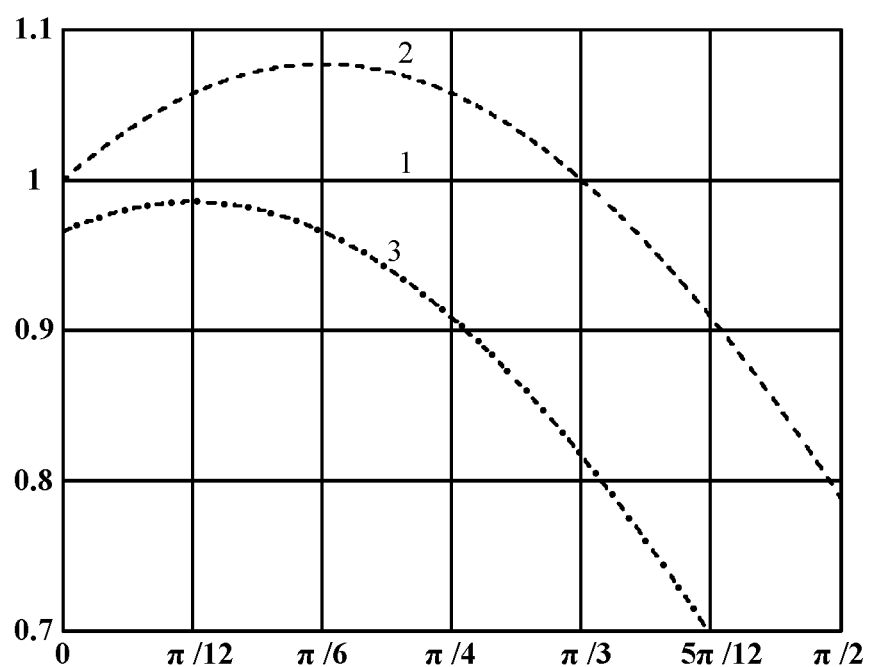
FIG. 8A is a schematic diagram of the comparison of an ability of a motor to do work and a field weakening ability of the motor according to an example of the present application.
Figure 8B:
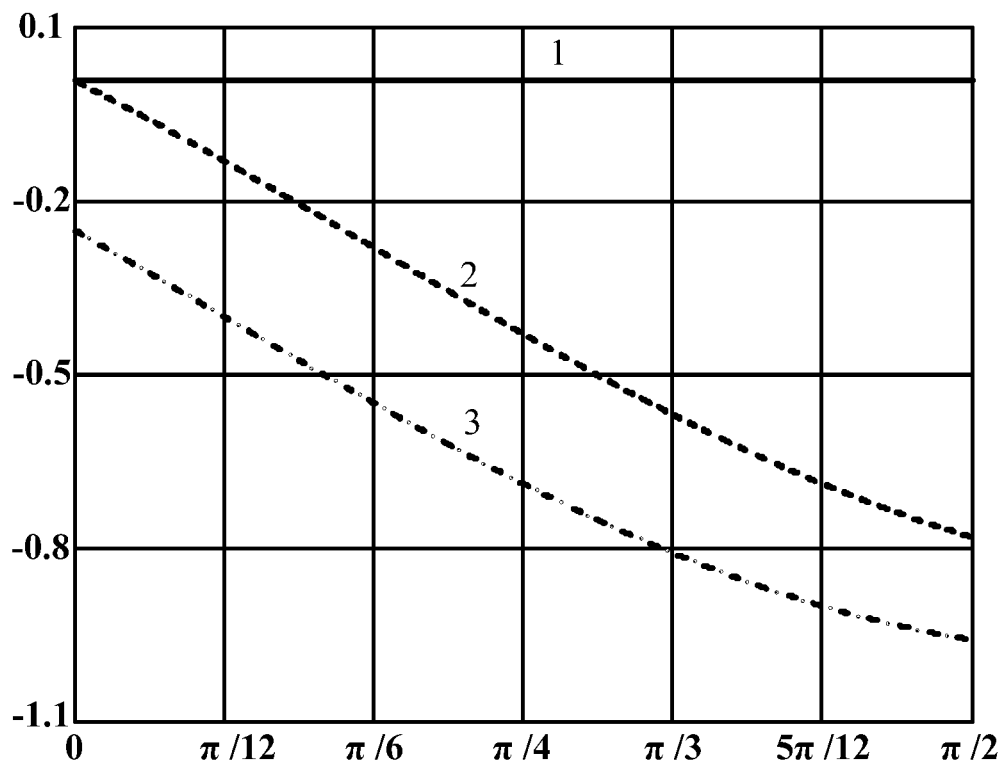
FIG. 8B is a schematic diagram of the comparison of an ability of a motor to do work and a field weakening ability of the motor according to an example of the present application.

Referring to the comparison diagram of the field weakening ability of the motor and the ability of the motor to do work shown in FIG. 8, the horizontal axis represents the expansion angle, the vertical axis of FIG. 8A represents the ability of the motor to do work, and the vertical axis of FIG. 8B represents the excitation ability of the motor, where the excitation ability includes the field enhancing ability and the field weakening ability. In FIG. 8A, line 1 represents the ability of the motor to do work in the case of no lead angle and two conducting transistors for the windings, that is, when the lead angle is 0 and the expansion angle is also 0; line 2 represents the ability of the motor to do work in the case of no lead angle and a combination of two conducting transistors and three conducting transistors for the windings, that is, when the lead angle is 0 and the expansion angle is not 0; and line 3 represents the ability of the motor to do work in the case of a lead angle and a combination of two conducting transistors and three conducting transistors for the windings, that is, when the lead angle is not 0 and the expansion angle is also not 0. In FIG. 8B, line 1 represents the excitation ability of the motor in the case of no lead angle and two conducting transistors for the windings, that is, when the lead angle is 0 and the expansion angle is also 0; line 2 represents the excitation ability of the motor in the case of no lead angle and a combination of two conducting transistors and three conducting transistors for the windings, that is, when the lead angle is 0 and the expansion angle is not 0; and line 3 represents the excitation ability of the motor in the case of a lead angle and a combination of two conducting transistors and three conducting transistors for the windings, that is, when the lead angle is not 0 and the expansion angle is also not 0. The excitation ability with a positive value represents the field enhancing ability, and the excitation ability with a negative value represents the field weakening ability. As can be seen from FIG. 8A, when a certain expansion angle is set, the ability of the motor to do work can be enhanced. The expansion angle β has a range of 0 to π/3. Based on the set expansion angle, the lead angle α reduces the ability of the motor to do work to a certain extent. However, even at π/3, a difference between line 1 and line 3 is smaller than 0.2. That is to say, an increase of the lead angle has a small effect on the ability of the motor to do work to a certain extent. As can be seen from FIG. 8B, when the expansion angle β is set, the field weakening ability of the motor can be enhanced. On this basis, the increase of the lead angle α greatly improves the field weakening ability of the motor. To sum up, when an appropriate expansion angle is used, the field weakening ability of the motor and the ability of the motor to do work can be balanced so that the rotational speed of the motor can be increased on the premise of ensuring the ability to do work.

In a specific implementation, the controller 24 can acquire the rotor position information. When the rotor position is different, the conduction manner of the stator windings is different, and the stator magnetic potential is different in a different conduction manner of the windings. Therefore, the controller 24 may control, according to the rotor position information, the conduction states for the windings to change so as to adjust the stator magnetic potential and can determine the resultant magnetic potential of the motor according to the rotor magnetic potential and the adjusted stator magnetic potential, where the output electrical parameter of the motor under the resultant magnetic potential is within a preset parameter range. That is to say, the resultant magnetic potential of the motor is adjusted so that the motor can satisfy a certain rotational characteristic. In an example, the electrical parameter of the motor may be the rotational speed of the motor or the work efficiency determined based on the rotational speed and the torque. The above process may be understood as that the controller may adjust the conduction manner of the stator windings according to the rotor position information such that the rotational speed of the motor can reach a certain speed or be increased to a certain range while it is ensured that the motor has relatively high work efficiency. The conduction manner of the windings includes two conducting transistors and/or three conducting transistors and/or the combination of two conducting transistors and three conducting transistors and expansion angles and/or lead angles in different conduction manners.

As can be seen from FIGS. 3 and 4, the stator magnetic potential at a unit current when any two phases of the stator windings of the three-phase motor are on is smaller than the stator magnetic potential at a unit current when the three phase windings are on. Therefore, when the rotor is at a first preset position, the controller 24 may increase the stator magnetic potential by controlling all the three-phase stator windings of the motor to be on to access the power module; when the rotor is at a second preset position, the controller 24 may reduce the stator magnetic potential by controlling any two phases of the stator windings of the motor to be on to access the power module. An increase of the stator magnetic potential may be increasing the magnitude of the stator magnetic potential without changing the current direction of the stator magnetic potential or increasing the magnitude of the stator magnetic potential while changing the direction of the stator magnetic potential. A decrease of the stator magnetic potential may be decreasing the stator magnetic potential to zero or a certain value without changing the current direction of the stator magnetic potential or decreasing the stator magnetic potential to zero or a certain value while changing the direction of the stator magnetic potential.

In an example, when the rotor is at the first preset position, the controller may control the stator windings to switch from the manner of two conducting transistors to the manner of three conducting transistors, and when the rotor is at the second preset position, the controller may control the stator windings to switch from the manner of three conducting transistors to the manner of two conducting transistors. It is to be understood that within the selected phase band, the manner of two conducting transistors or the manner of three conducting transistors may be switched multiple times. Therefore, the first preset position and the second preset position are not fixed rotor positions but positions of the rotor when the electrical parameter exceeds a preset range as the resultant magnetic potential of the motor changes during the rotation of the rotor. In a specific implementation, the controller identifies a current rotor position through the rotor position detection module 22 and determines whether the current position is the first preset position or the second preset position.

That is to say, within the selected phase band, the rotor position information is detected and the number of conducting stator windings is adjusted so that the stator magnetic potential can be adjusted, thereby affecting the resultant magnetic potential, that is, affecting the first resultant magnetic potential and the second resultant magnetic potential, so as to increase the rotational speed of the motor on the premise of a relatively small effect on the ability of the motor to do work.

As can be seen from the preceding examples, the conduction manner of the stator windings of the three-phase sensorless BLDC motor within the selected phase band may be switched according to the rotor position information, for example, switched between a first conduction manner in which two phase windings are on and a second conduction manner in which the three phase windings are on. In this example, it is defined that two phases of the stator windings are on at a first electrical angle in the first conduction manner (that is, two transistors are on), and three phases of the stator windings are on at a second electrical angle in the second conduction manner (that is, three transistors are on). Then, the motor has first electromagnetic torque when on at the first electrical angle in the first conduction manner and has second electromagnetic torque when on at the second electrical angle in the second conduction manner. The electromagnetic torque, that is, the output torque of the motor, can represent the ability of the motor to do work.

Since the motor has reluctance torque that affects the ability of the motor to do work, the reluctance torque and the electromagnetic torque in a different conduction manner together constitute total torque of the motor, where the total torque can accurately reflect the ability of the motor to do work. It is to be understood that the greater the total torque of the motor at a unit current, the more power-saving the tool. Therefore, energy consumption can be further reduced on the premise of ensuring the ability of the motor to do work and increasing the rotational speed of the motor.

Figure 9:
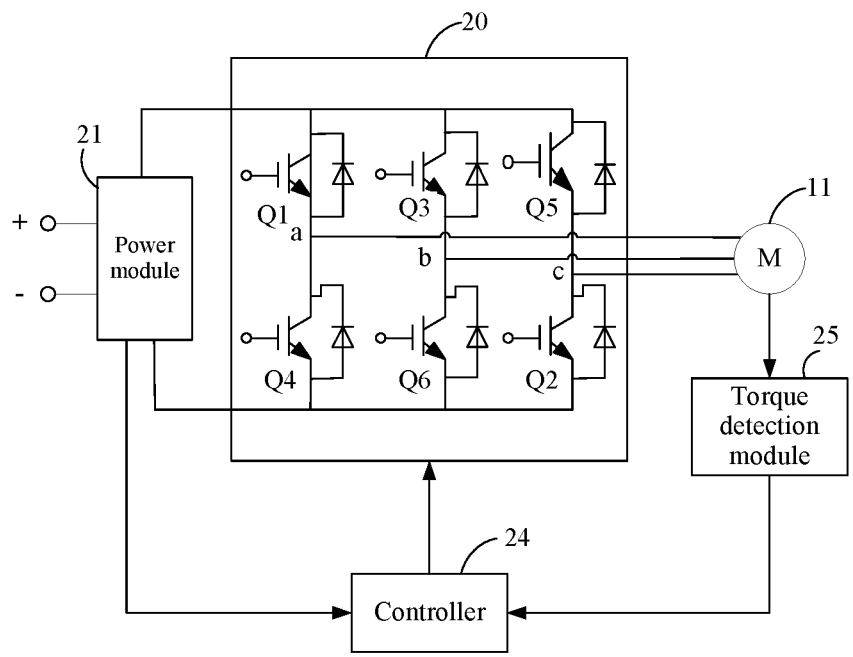
FIG. 9 is a circuit block diagram of a power tool according to an example of the present application.

Referring to the circuit block diagram of the power tool shown in FIG. 9, the power tool further includes a torque detection module 25 configured to detect the output torque of the motor in different conduction manners of the stator windings. For example, the torque detection module may detect the first electromagnetic torque when the motor is on at the first electrical angle in the first conduction manner and the second electromagnetic torque when the motor is on at the second electrical angle in the second conduction manner. It is to be understood that the torque detection module 25 may also detect the reluctance torque of the motor, where the reluctance torque is caused by different reluctance of the rotor in the motor on the direct axis and the quadrature axis.

Figure 10:
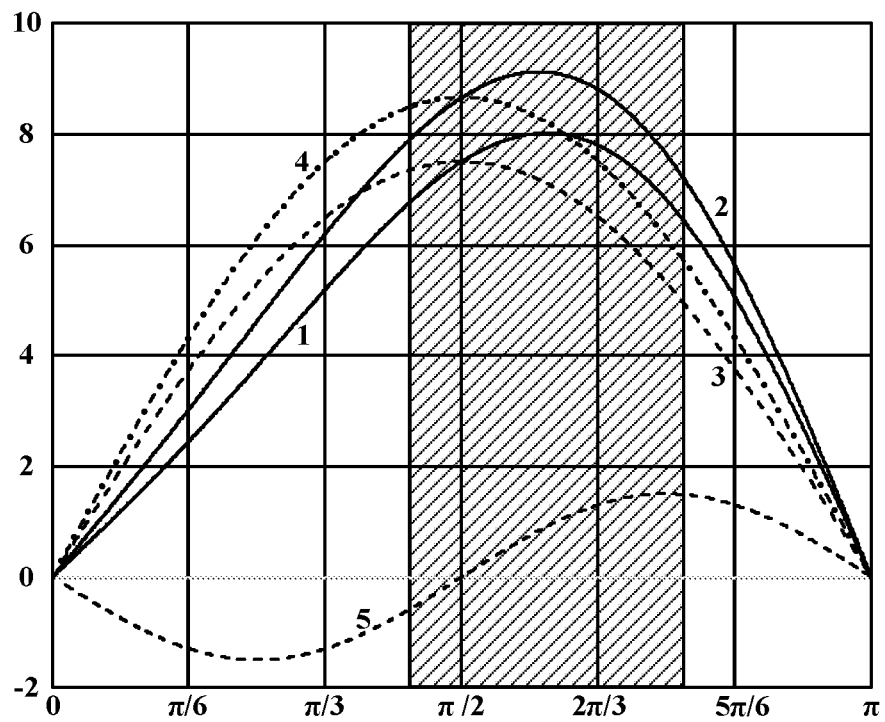
FIG. 10 is a schematic diagram of electromagnetic torque according to an example of the present application.
Figure 11:
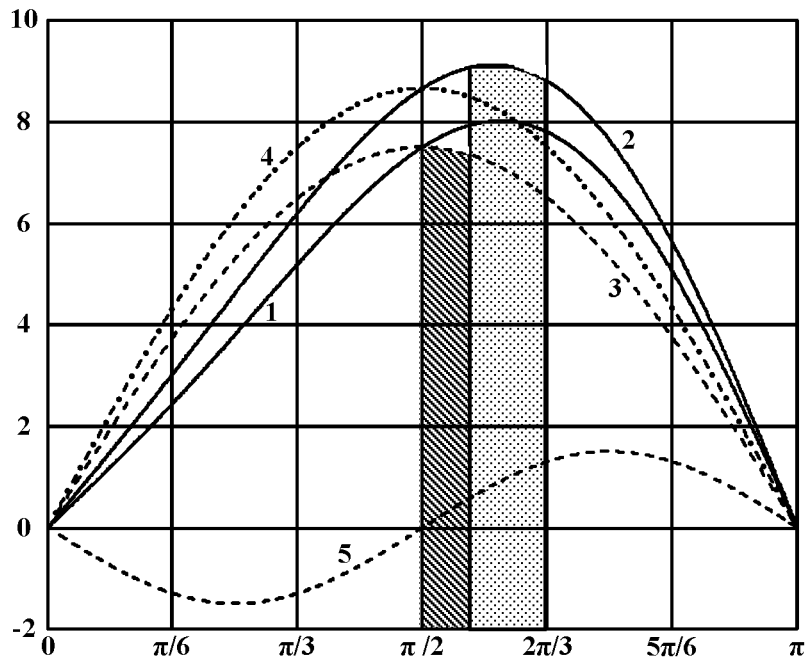
FIG. 11 is a schematic diagram of electromagnetic torque according to an example of the present application.

Referring to the schematic diagrams of the electromagnetic torque shown in FIGS. 10 and 11, the horizontal axis represents an angle of rotation of the rotor, the vertical axis represents the magnitude of torque, line 1 represents the total torque of the motor in the first conduction manner, line 2 represents the total torque of the motor in the second conduction manner, line 3 represents the first electromagnetic torque of the motor in the first conduction manner, line 4 represents the second electromagnetic torque of the motor in the second conduction manner, and line 5 represents the reluctance torque of the motor. As can be seen from FIG. 10, the reluctance torque of the motor has a sine-like waveform. That is to say, the reluctance torque can increase the total torque of the motor within a certain electrical angle and can reduce the total torque of the motor within a certain electrical angle. Therefore, a shaded area in FIG. 10 represents a range of an interval of the angle of rotation of the rotor when the motor has maximum total torque, where the interval ranges from 90° to 135°. That is to say, a domain of definition of the motor having the maximum total torque is 90° to 135°. Further, two shaded areas shown in FIG. 11 represent first total torque in the first conduction manner and second total torque in the second conduction manner at a unit current, respectively, where the sum of the first total torque and the second total torque is the finally required total torque of the motor. That is to say, a maximum sum of areas of the two shaded areas shown in FIG. 11 corresponds to the maximum total torque of the motor at a unit current.

Based on this, the controller 24 may adjust the first electrical angle in the first conduction manner and the second electrical angle in the second conduction manner according to the rotor position of the motor such that the total torque of the motor at a unit current within the selected phase band is within a preset torque range. It is to be understood that different tools have different energy consumption and different preset torque. In the present application, the preset torque range may cover values of the total torque of the motor corresponding to different energy consumption requirements of different tools.

It is to be understood that the preceding process of adjusting the electrical angles in different conduction manners of the stator windings is a process of affecting the stator magnetic potential. Therefore, in the process of adjusting the total torque to reduce the energy consumption of the motor, a relatively small effect is imposed on the ability of the motor to do work and the increase of the rotational speed of the motor.

In an example, the ratio of the first electrical angle to the second electrical angle within the selected phase band may be obtained according to the preset torque range in a table look-up manner.

For different tools and specific use conditions of the different tools, the conduction manner of the stator windings of the motor may be controlled so as to ensure that the power tool has stable output performance and relatively large output power under different working conditions.

Generally, an operating stage of the tool may be divided into a high-speed operating stage and a low-speed operating stage, where the motor has different minimum rotational speeds at high-speed operating stages of different tools under different working conditions, and the motor has different maximum rotational speeds at low-speed operating stages of different tools under different working conditions. In an example, the high-speed operating stage is defined as a first working stage of the tool and the low-speed operating stage is defined as a second working stage of the tool. Generally, in the first working stage, it is desired that the motor continuously works at a substantially constant rotational speed for a period of time and enters the second working stage before a working parameter of the motor is overloaded. In the present application, the operation of the motor is controlled in a conduction manner switched between two conducting transistors and three conducting transistors. Therefore, to obtain a substantially stable rotational speed in the first working stage, the controller adjusts, in the first working stage, the second electrical angle R at which the motor is on in the second conduction manner, that is, the manner of three conducting transistors such that the rotational speed of the motor is kept in a substantially stable state. Further, in the second working stage, the stator windings may be controlled to be on at a first preset electrical angle, that is, a fixed electrical angle, in the manner of three conducting transistors. In particular, in the first working stage and the second working stage, the motor is switched between the manner of two conducting transistors and the manner of three conducting transistors, that is, in each of two working stages, the motor has two conduction manners, two conducting transistors and three conducting transistors. Moreover, the electrical angles in the manner of two conducting transistors in the two working stages have a fixed value, for example, a second preset electrical angle. Therefore, the electrical angle at which the motor is on in the manner of two conducting transistors in the two working stages is not described in the present application. That is to say, for the tool, the electrical angle in the manner of three conducting transistors in the high-speed operating stage continuously changes, the electrical angle in the manner of three conducting transistors in the low-speed operating stage remains unchanged, and the electrical angles in the manner of two conducting transistors of the windings in two operating stages have a fixed value. In this example, the magnitude of the first preset electrical angle and the magnitude of the second preset electrical angle are not specifically limited.

In an example, the controller 24 adjusts the electrical angle (the expansion angle $\beta$) at which the stator windings of the motor are on in the second conduction manner (that is, three conducting transistors) and keeps the stator windings on at a fixed lead angle $\alpha$ so that the rotational speed of the motor can be substantially constant. For example, in the first working stage, the stator windings have a lead angle of 15° and the expansion angle in the manner of three conducting transistors changes from 0° to 45° so that the rotational speed of the motor can be kept in a relatively stable state.

Figure 12:
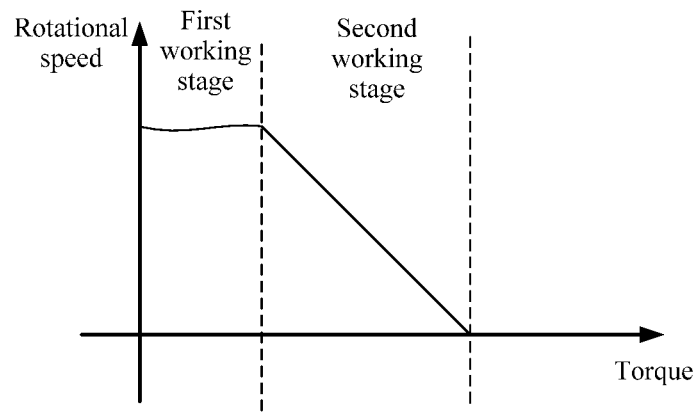
FIG. 12 is a schematic diagram of output performance of a tool in different stages according to an example of the present application.

As shown in FIG. 12, the horizontal axis represents the output torque T of the motor and the vertical axis represents the rotational speed n of the motor, where in the first working stage, the rotational speed of the motor and the output torque of the motor remain substantially constant, and line 1 is substantially parallel to the horizontal axis. However, in the first working stage, the current of the motor rises at a relatively high rate and the motor is subjected to a relatively large current in a short time. Thus, the first working stage should not be maintained for too long a duration. In an implementation, when the motor is in the first working stage, the controller 24 may stop adjusting the electrical angle in the first conduction manner to make the stator windings of the motor on at a third preset electrical angle and maintain the fixed lead angle $\alpha$ to reduce the rotational speed of the motor and reduce a change slope of the working current of the motor so that the motor enters the second working stage. The third preset electrical angle is a fixed electrical angle, and the magnitude of the third preset electrical angle is not specifically limited in the present application. It is to be understood that if the motor always maintains a relatively high rotational speed, serious heating is caused. Therefore, when the speed needs to be reduced, the controller may control the motor to enter the second working stage.

In an example, when a conduction angle in the second conduction manner reaches an angle threshold, the controller may control the motor to enter the second working stage. For example, when the expansion angle changes from 0° to 45° in the first working stage, the controller 24 no longer adjusts the expansion angle so that the windings of the motor are on at a lead angle of 15° and a fixed expansion angle smaller than or equal to 45° and enter the second working stage.

Figure 13:
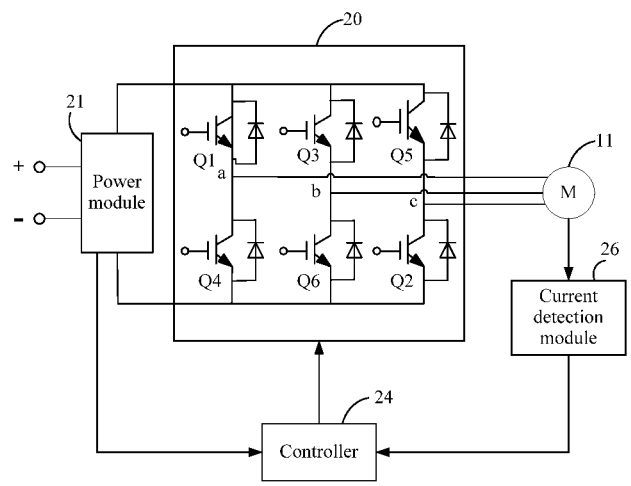
FIG. 13 is a circuit block diagram of a power tool according to an example of the present application.
Figure 14:
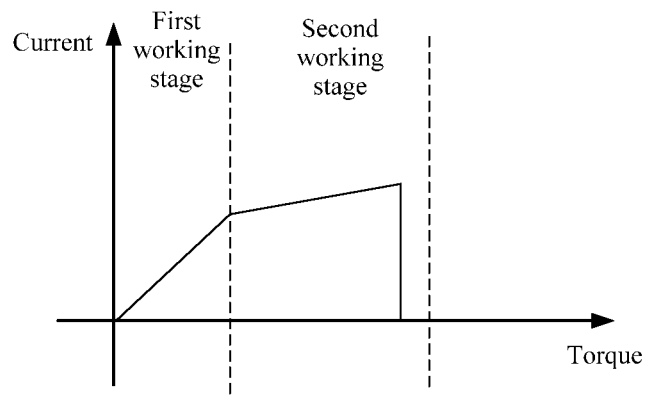
FIG. 14 is a schematic diagram of output performance of a tool in different stages according to an example of the present application.

In an example, as shown in FIG. 13, the power tool further includes a current detection module 26 configured to detect the working current of the motor. After acquiring the working current of the motor, the controller 24 may calculate a current change slope. Further, the controller may control, according to a current change slope of the motor in the first working stage, the motor to switch to the second working stage, that is, control the electrical angle at which the stator windings of the motor are on in the second conduction manner to be the first preset electrical angle. That is to say, in the second working stage, the lead angle $\alpha$ of the stator windings of the motor and the expansion angle R in the manner of three conducting transistors both have fixed values. In the present application, it is defined that the working current of the motor has a first change slope in the first working stage and a second change slope in the second working stage. As shown in FIG. 14, the horizontal axis represents the output torque of the motor and the vertical axis represents the working current of the motor. As can be seen from FIG. 14, the second change slope of the current of the motor in the second working stage is significantly smaller than the first change slope in the first working stage. As can be seen from FIGS. 12 and 14, in the second working stage, the current change slope becomes smaller, the working current value does not decrease, and the rotational speed of the motor decreases.

In a specific implementation, when detecting, in the first working stage of the motor, that the working current of the motor reaches a current threshold at the first change slope, the controller 24 may control the motor to switch to the second working stage, that is, no longer adjust the expansion angle $\beta$. It is to be understood that in the first working stage, when the working current of the motor reaches the current threshold at the first change slope, the expansion angle $\beta$ of the windings of the motor in the manner of three conducting transistors is a maximum electrical angle reachable in the second conduction manner. In the second working stage, the fixed second electrical angle in the manner of three conducting transistors is smaller than or equal to the above maximum electrical angle. For example, when the expansion angle in the manner of three conducting transistors is adjusted from 0° to 20° in the first working stage, the working current of the motor reaches the current threshold in the first working stage, and the controller controls the motor to be on at a lead angle of 15° and a fixed expansion angle smaller than or equal to 20° and enter the second working stage. That is to say, when the working current of the motor reaches the current threshold at the first change slope in the first working stage, even if the electrical angle in the second conduction manner is smaller than the angle threshold, the controller controls the motor to enter the second working stage.

The expansion angle is adjusted in the first working stage so as to maintain the rotational speed of the motor and the output torque of the motor, which can ensure that the motor maintains stable output performance in a startup stage under different working conditions; and the expansion angle is fixed so that when the motor works in the second stage, the current can be prevented from increasing continuously and rapidly, avoiding damage to the motor.

What is claimed is:

1. A power tool, comprising:
    a motor comprising a rotor and multi-phase stator windings;
    a driver circuit having a plurality of switch elements for outputting switch signals to drive the motor to rotate; and
    a controller electrically connected to at least the driver circuit and the motor,
    wherein the controller is configured to:
        acquire a rotor position information of the motor; and
        adjust a resultant magnetic potential of the motor according to the rotor position information such that an output electrical parameter of the motor corresponding to the resultant magnetic potential is within a preset parameter range, and wherein the controller is further configured to control the driver circuit to change conduction states to increase a stator magnetic potential when the rotor is at a first preset position and control the driver circuit to change the conduction states to decrease the stator magnetic potential when the rotor is at a second preset position.

2. The power tool according to claim 1, wherein the controller is configured to control conduction states of the driver circuit based on the rotor position information to adjust a stator magnetic potential of the stator windings, and calculate the resultant magnetic potential of the motor based on a rotor magnetic potential of the motor and the adjusted stator magnetic potential of the motor such that the output electrical parameter of the motor corresponding to the resultant magnetic potential is within the preset parameter range.

3. The power tool according to claim 1, further comprising a rotor position detection module configured to detect a rotor position of the motor, and an electrical parameter detection module electrically connected to the motor and configured to detect the output electrical parameter of the motor.

4. The power tool according to claim 3, wherein the rotor position detection module comprises a Hall sensor.

5. The power tool according to claim 3, wherein the rotor position detection module is configured to estimate the rotor position based on a back electromotive force of the stator windings or estimate the rotor position based on phase currents of the stator windings.

6. The power tool according to claim 1, wherein the controller is configured to calculate, based on a rotor magnetic potential of the motor and an adjusted stator magnetic potential of the motor, a first resultant magnetic potential in a first direction and a second resultant magnetic potential in a second direction such that a rotational speed of the motor corresponding to the first resultant magnetic potential is within a preset rotational speed range and work efficiency of the motor corresponding to the second resultant magnetic potential is within a preset efficiency range.

7. The power tool according to claim 6, wherein the first direction is perpendicular to the second direction.

8. The power tool according to claim 5, wherein the motor has three-phase stator windings and the controller is configured to control the driver circuit to change conduction states such that the three-phase stator windings of the motor are all on to access a power module when the rotor is at a first preset position and control the driver circuit to change the conduction states such that any two phases of the three-phase stator windings of the motor are on to access the power module when the rotor is at a second preset position.

9. A control method for a power tool, wherein the power tool comprises:
a motor comprising a rotor and a plurality of stator windings;
a driver circuit having a plurality of switch elements for outputting switch signals to drive the motor to rotate; and
a controller electrically connected to at least the driver circuit and the motor; and
the control method comprises:
acquiring a rotor position information of the motor;
adjusting a resultant magnetic potential of the motor according to the rotor position information such that an output electrical parameter of the motor corresponding to the resultant magnetic potential is within a preset parameter range, and
controlling the driver circuit to change conduction states to increase a stator magnetic potential when the rotor is at a first preset position and control the driver circuit to change the conduction states to decrease the stator magnetic potential when the rotor is at a second preset position.

* * * * *